United States Patent Office 3,360,986
Patented Jan. 2, 1968

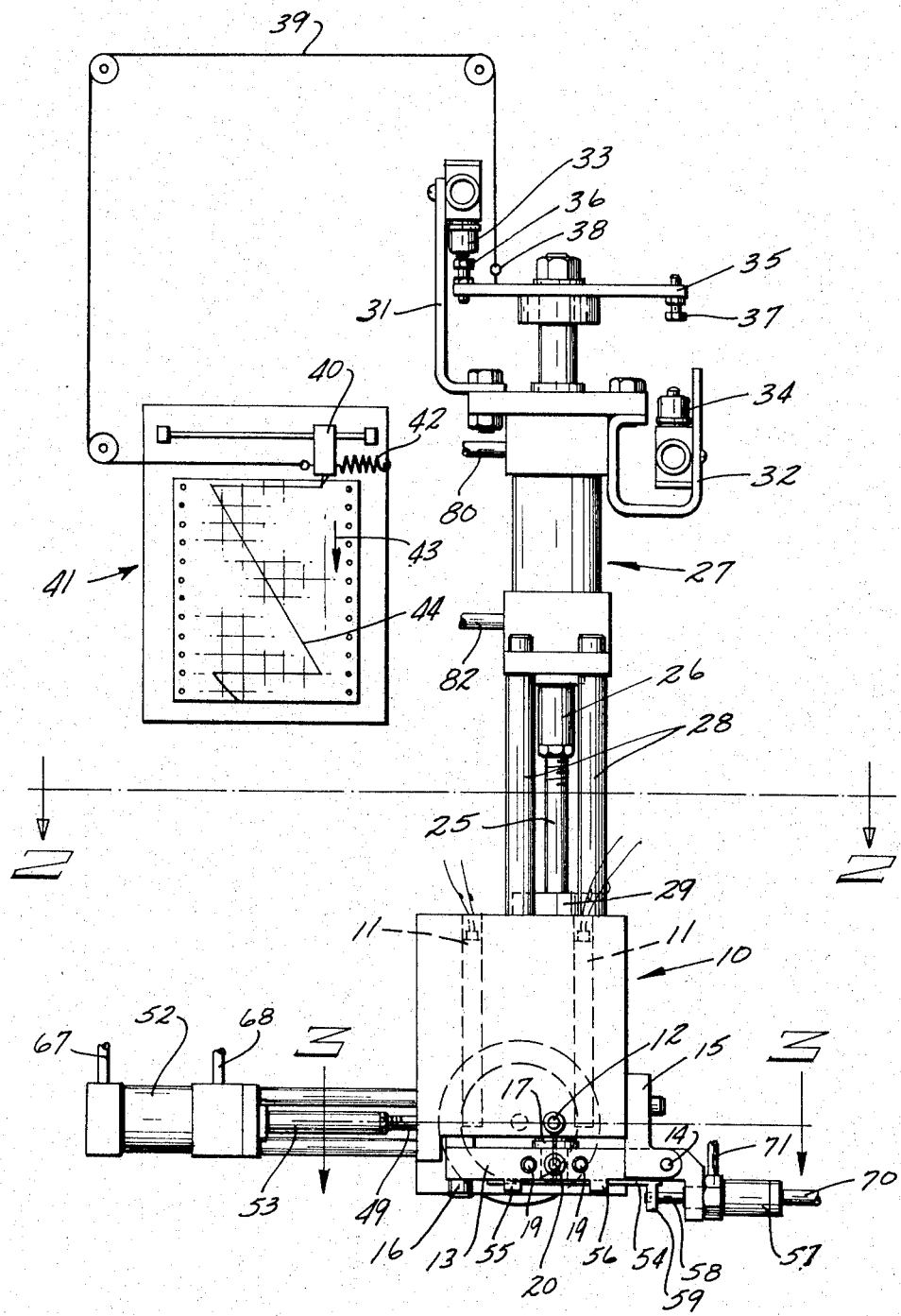

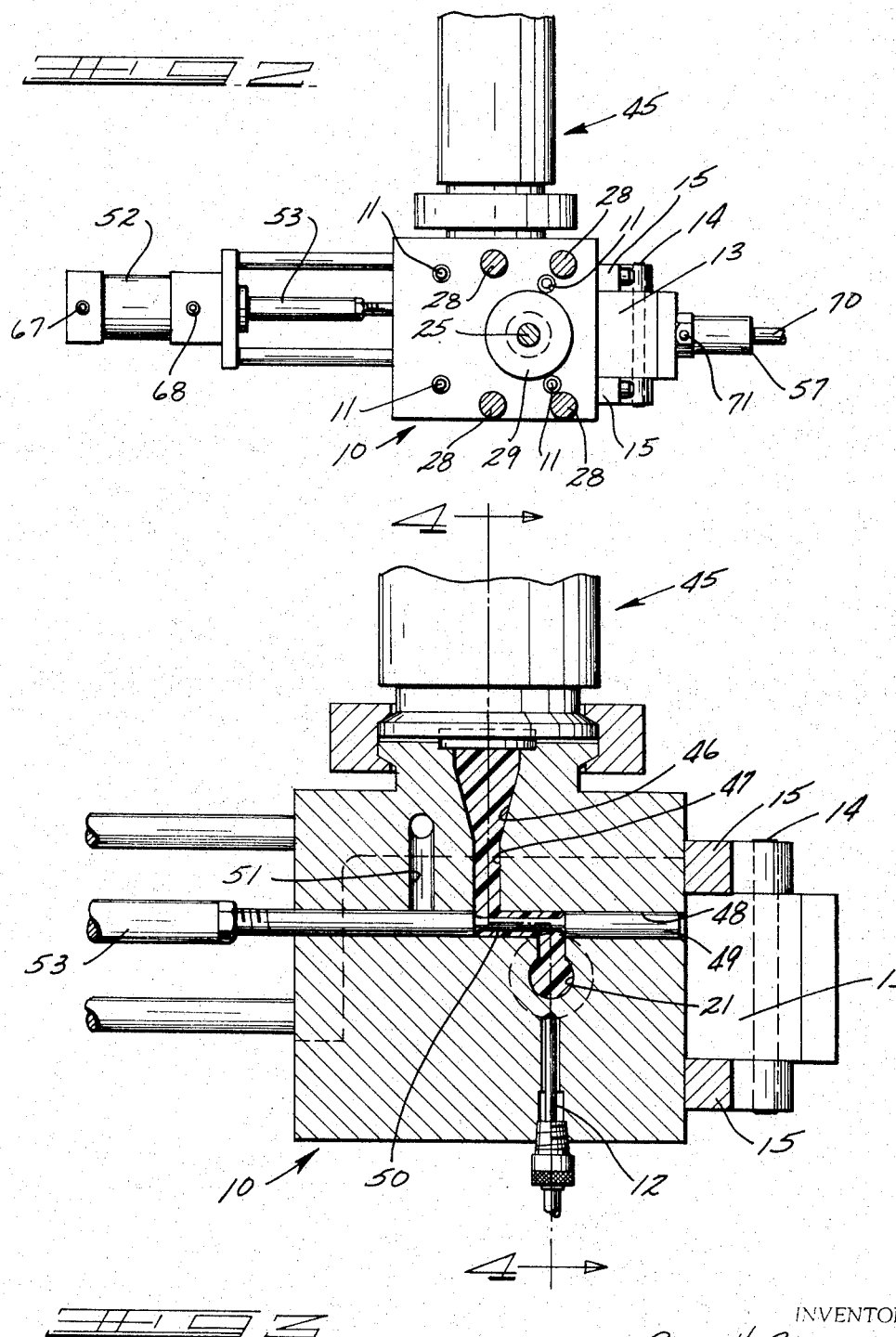

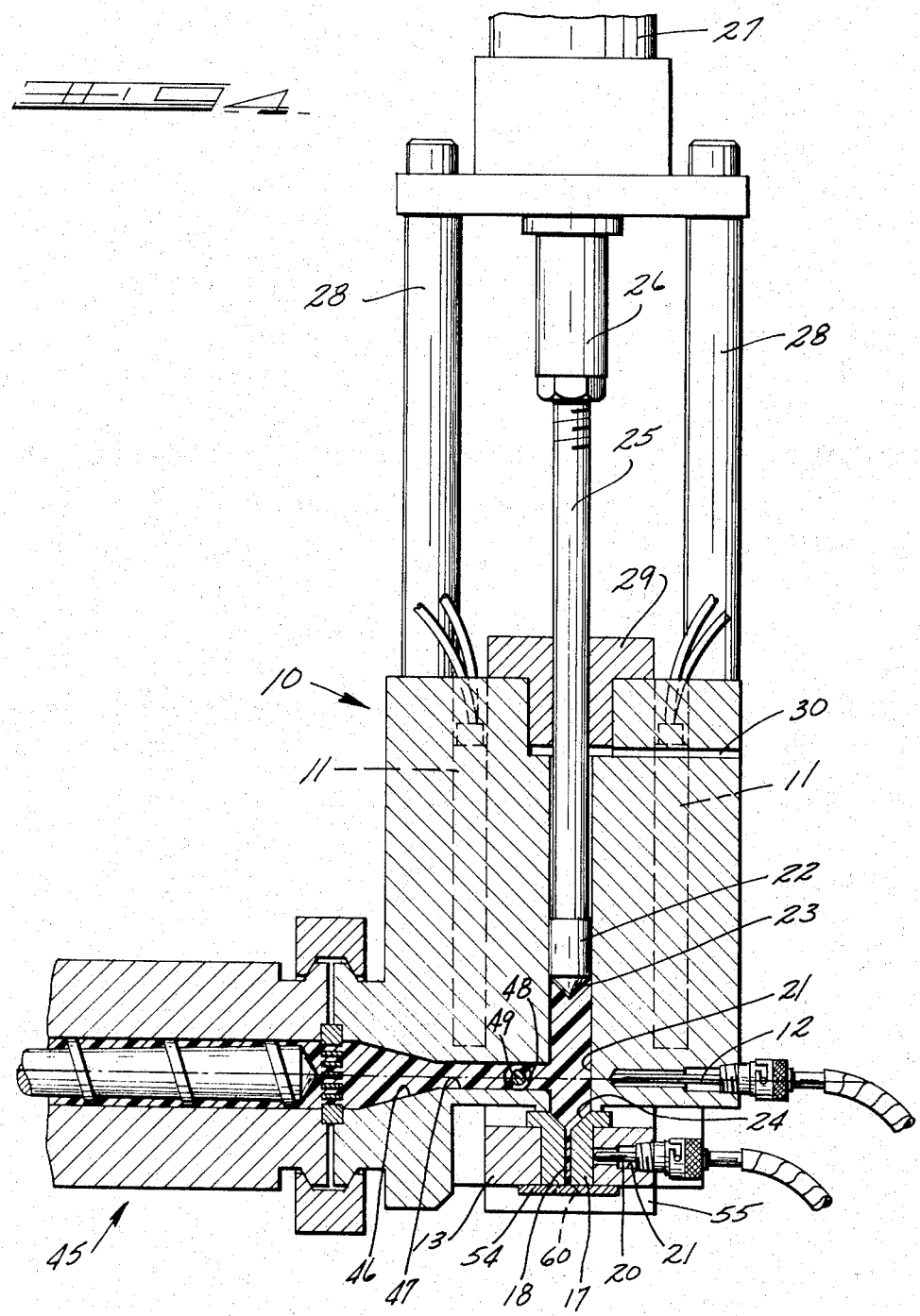

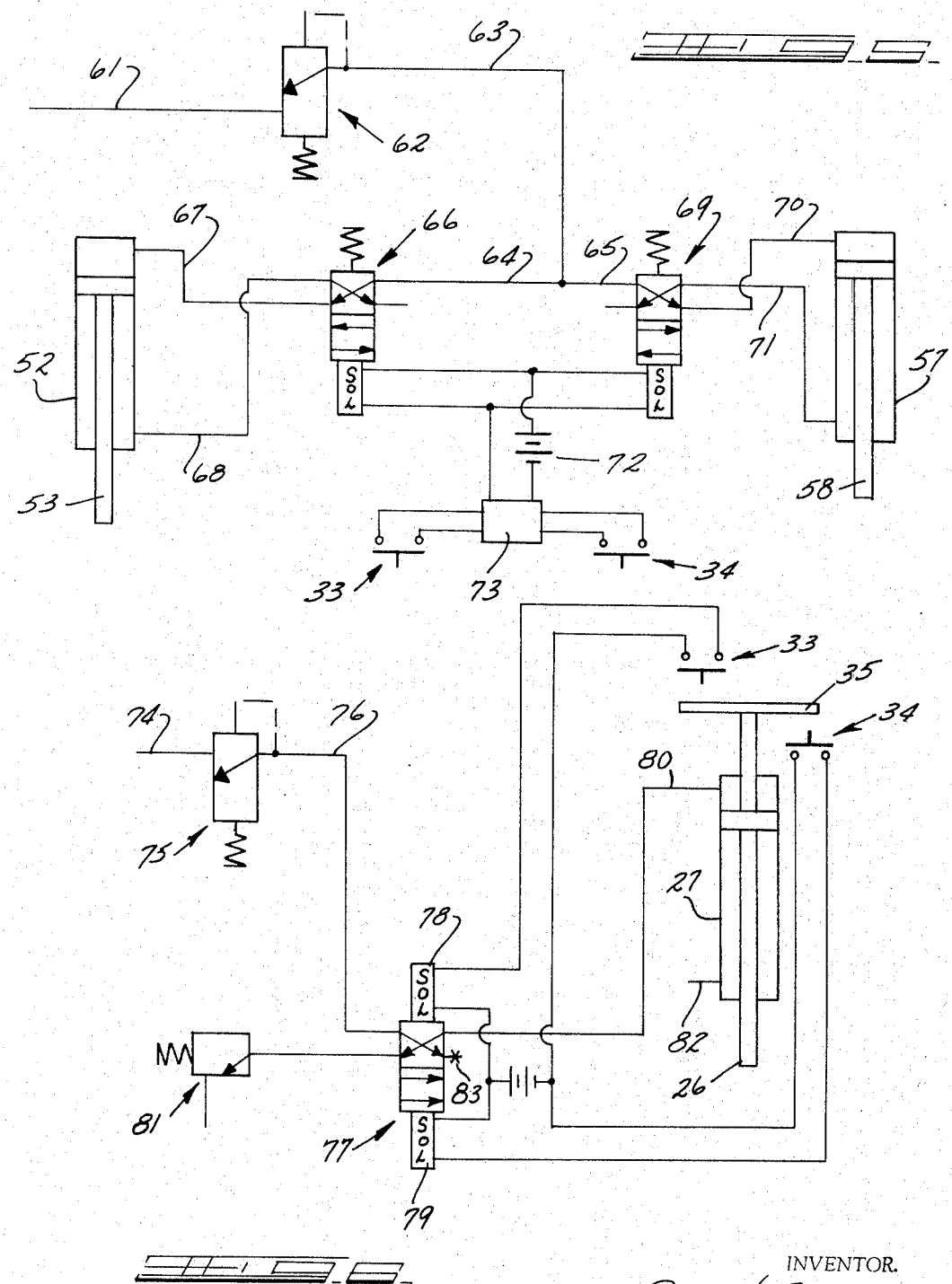

3,360,986
FLOW TESTER FOR PLASTIC MATERIALS
Paul H. Rothschild, Toledo, Ohio, assignor to Owens-Illinois, Inc., a corporation of Ohio
Filed May 21, 1965, Ser. No. 457,768
1 Claim. (Cl. 73—56)

ABSTRACT OF THE DISCLOSURE

This case deals with apparatus for testing the flow properties of plastics which have foaming agents incorporated therein. The plastic to be tested is extruded under pressure into a chamber of predetermined volume, where the plastic is kept under pressure to prevent foaming, and then forced at a predetermined pressure through a capillary flow restriction with a measurement of the time necessary to discharge a predetermined volume being a measure of the flow property of the plastic.

More particularly, this invention relates to apparatus for determining the melt-flow characteristics of foamable plastic materials in which foaming is prevented during testing.

The extrusion and molding of plastic materials is determined to a large extent by the flow characteristics of the material. When working with polyethylene, in which a foaming agent has been incorporated, or molten polymers in general, it is desirable to know the flow characteristics of these materials at various shear rates, particularly high shear rates, so as to be able to select the proper plastic material for a given molding operation.

The present invention is directed to apparatus for obtaining accurate flow data on foam polyethylene and foamed polymers in general. When dealing with polyethylene, in particular, and polymers in general which have foaming agents incorporated therein, it has been found necessary to determine the flow characteristics of these materials prior to the expansion of the material by the foaming agent. The most accurate type of flow testers, particularly flow testers of the high shear type, utilize a capillary flow restriction through which the material is flowed. The present invention is based on a measurement of the flow velocity of the molten polymers, through a capillary flow restriction under controlled shear stress conditions.

With the foregoing in view, it is an object of this invention to provide apparatus for testing foam polymers to determine the melt rheology thereof.

It is an additional object of this invention to provide apparatus for determining the rheological properties of foam polymers in a continuous, in-process, high shear viscometer.

It is a further object of this invention to provide apparatus for measuring the rheological properties of foam plastics which is capable of measuring the flow characteristics of plastics at preselected shear stress values.

It is a still further object of this invention to provide apparatus for testing the melt flow characteristics of foam polymers, which is automatic in its operation, requiring little or no attendance and providing a continuous record of the measurements.

Other and further objects will be apparent from the following description taken in conjunction with the annexed sheets of drawings, wherein:

FIG. 1 is a side elevational view of the apparatus of the invention;

FIG. 2 is a cross-sectional view taken at lines 2—2 of FIG. 1;

FIG. 3 is a cross-sectional view taken at line 3—3 of FIG. 1, on an enlarged scale;

FIG. 4 is a cross-sectional view taken at line 4—4 of FIG. 3;

FIG. 5 is an air and electrical diagram for the piston motors utilized to divert the flow from the extruder and close the exit end of the capillary; and, FIG. 6 is a fluid circuit and electrical circuit diagram for the main ram motor.

With particular reference to FIGS. 1–4, the apparatus of the invention comprises a main block 10 having numerous passages formed therein. The block 10 is made of a suitable metal and is provided with electric heating elements 11, of which four are shown, extending through vertical bores formed in the block 10. The heating elements 11 are controlled by a temperature sensing element 12 mounted within an opening formed in the side of the block 10. A capillary supporting block 13 is mounted for swinging movement with respect to the undersurface of the block 10 about a horizontal shaft 14. The shaft 14 is fixed to the side of the block 10 by a mounting bracket 15.

As can be seen when viewing FIG. 1, the block 13 is supported at one end by the shaft 14 and is bolted to the undersurface of the block 10 by bolts 16 at its opposite end.

Intermediate the length of the block 13 there is provided a vertical opening within which the accurately machined member 17 is mounted. Member 17 is provided with a capillary bore 18. The temperature of the member 17 is controlled by a pair of electric heaters 19 which are positioned in horizontal openings formed in the block 13 on opposite sides of the member 17 (see FIG. 1).

The power control for the heaters 19 is provided by a temperature sensing element 20 mounted within a horizontal bore 21 formed in the block 13 and opening into the vertical bore which supports the capillary member 17. Thus the temperature sensing element 20 will accurately sense the temperature of the member 17 and through suitable, readily available, control means, regulate the amount of current flow to the electric heaters 19 so as to maintain the member 17 at a preselected elevated temperature.

As best shown in FIG. 4, the capillary member 17 is held against the undersurface of the block 10 in vertical alignment with a bore 21 extending through the block 10. Within the bore 21 is positioned a ram 22 having a conical tip 23. The upper surface of the member 17 is provided with a conical recess 24 which is of the same slope as the conical tip 23 of the ram 22. The ram 22 is joined by a connecting rod 25 to the output shaft 26 of a reciprocating piston-cylinder motor 27. The motor 27 is supported above the block 10 by four supporting rods 28. An annular bearing block 29, seated within an opening in the upper surface of the block 10, serves to guide the rod 25 in its vertical reciprocating movement.

The upper end of the bore 21, within which the ram 22 reciprocates, is vented to atmosphere through a passage 30 formed in the block 10. The upper end of the motor 27 carries a pair of switch mounting brackets 31 and 32. The bracket 31 has a switch 33 fixed thereto and the bracket 32 has a switch 34 carried thereby. The motor 27, in addition to having an output shaft 26 extending vertically downward therefrom, also has an extension of this shaft extending vertically upward therefrom to which a horizontal plate 35 is fixed.

The plate 35 carries a pair of vertically adjustable bolts 36 and 37 whose heads are respectively engageable with switches 33 and 34. Thus it can be seen that in the operation of the motor 27, wherein the piston has an upward travel, the switch 33 will be closed when the bolt 36 engages it and on the return or downward stroke of the motor 27 the bolt 37 will contact the switch 34. The plate 35, in addition to carrying the bolts 36 and 37, has a ring 38 fixed to the upper surface thereof to which a cord or wire member 39 is attached. The opposite end of the member 39 is connected to a pen arm 40 of a moving chart recorder 41. The pen arm 40 of the recorder 41 is mounted for horizontal shifting movement in response to the raising and lowering movement of the plate 35. A spring 42 biases the arm 40 to the right, as viewed in FIG. 1, and maintains the flexible member 39 under tension. The chart paper in the recorder 41 is moving in the direction of the arrow 43 shown thereon at a constant speed.

Thus it can be seen that the slope of the recorder line 44 provides an accurate record and/or indication of the rate of extrusion of the plastic through the capillary bore 18.

Thermoplastic material to be tested is fed to the block 10 by a continuously operating extruder 45 of conventional design. The extruder is coupled to a wall of the block 10 with its discharge end in alignment with a tapered inlet 46. The tapered inlet 46 is joined to an inlet passage 47 which in turn is connected to a transversely extending bore 48. The bore 48 carries a spool valve 49. The spool valve 49 has an undercut portion 50 which defines the flow channel for the plastic material entering the block from the extruder 45 and passing to the bore 21. With the valve 49 positioned as shown in FIG. 3, plastic from the extruder will be fed into the bore 21 causing the ram 22 to be lifted until the ram has been lifted to the extent necessary to close the switch 33, at which time an accurately metered volume of plastic is held within the bore 21. At this time the valve 49 is shifted to the left, as viewed in FIG. 3, so as to place the inlet passage 47 in communication, through the undercut portion 50 of the valve 49, with an outlet passage 51. In this manner, the bore 21, which has received the measured amount of plastic to be tested, is cut off from the supply of plastic; however, the extruder can continue to run feeding plastic material into the block 10; however, the plastic material will pass to the outlet 51 where it is discarded.

It has been applicant's experience that when dealing with thermoplastic materials it is necessary that the material be continuously worked in order that the material be maintained homogenous and that there be no degradation of the plastic caused by stopping of the extruder or blocking the extrusion. Thermoplastic material is of a thixotropic nature and its flow properties depend to a certain extent upon the manner in which the plastic is worked. Thus it is advantageous that the plastic material may be continuously moving from the extruder in the interval between the performance of the tests.

With this in view, applicant has provided a system whereby the measuring chamber is filled with the test sample and then the supply of plastic is diverted, yet it is being worked in the same manner continuously so as to maintain the samples homogenous and of like shear stress history.

The spool valve 49 is controlled by an air motor 52 whose output shaft 53 is connected to one end of the spool valve 49.

When the bore 21 is being filled, particularly with plastics which are of low viscosity, it is advantageous that the capillary bore 18 be closed at its exit end so as to ensure that the plastic, as it is filling the bore 21, can be maintained under slight pressure so that it does not expand or foam. With this in view, there is provided a plate 54 which is held in underlying, sliding contact with respect to the capillary supporting block 13.

The plate 54 is held in this underlying position by a pair of U-shaped guide blocks 55 and 56. The two blocks 55 and 56 permit longitudinal sliding movement of the plate 54 with respect to the block 13 and this reciprocation of the plate is effected by an air motor 57 whose output shaft 58 is coupled by a downwardly extending portion 59 formed integral with the plate 54. Thus it can be seen that actuation of the motor 57 will slide the plate 54 relative to the capillary support member 17.

The plate 54 has a frusto-conical opening 60 formed therein through which the plastic material will be extruded by the downward movement of the ram 22. At the end of the down stroke or measuring cycle of the invention, the plate 54 will be actuated to cut off the extrudate which is depending from the capillary bore 18, flush with the undersurface of the member 17. The plate 54 will remain in its closing position during the refilling of the bore 21.

With reference to FIG. 5, the sequence of operation of the motors 52 and 57 will be described. It should be understood that FIG. 5 is a schematic air diagram. An air inlet line 61 connected to a suitable supply of air, preferably of about 90 p.s.i., is connected to a regulating valve 62. The valve 62 is of the type which provides a constant pressure output in the line 63. The line 63 branches into two lines 64 and 65, with the line 64 going to solenoid operated valve 66 which, in its operation, controls the feeding of air under pressure to the motor 52, it being understood that the two positions of the valve 66 serve to alternately connect the air under pressure in line 64 to the lines 67 and 68 connected to opposite ends of the motor 52. The branch line 65 is connected to a solenoid operated valve 69 of the return spring type with the two positions of the valve determining the feeding of air under pressure alternately to the inlet lines 70 and 71 of the motor 57.

The solenoid actuators of the valves 66 and 69 are electrically connected to a battery 72 and a relay 73. It should be understood that both valves 66 and 69 are actuated simultaneously depending upon whether the circuit is completed through the relay 73 to the solenoids that are connected to the valves. The relay 73 is closed by the operation of the switch 33. The relay will remain closed until the switch 34 is actuated to open it. The relay then will remain open until the switch 33 is actuated.

Thus it can be seen that during the filling of the bore 21 with plastic, the motor 52 remains under pressure from the line 67 thus maintaining the valve 49 in the position shown in FIG. 3. Once the filling is completed and the switch 33 is actuated, the solenoid of the valve 66 will be actuated, causing a reversal of the connection of the air line 64 to the inlet line 68, thus retracting the valve 49 while at the same time, the solenoid valve 69 will be actuated as to feed air under pressure from the line 65 through the line 71 to the motor 57, causing retraction of the plate 54. With the plate 54 retracted, the frusto-conical opening 60, in the plate 54, will be placed in alignment with the capillary bore of the member 17. Both valves 66 and 69 will remain in the shifted position by the solenoids by reason of the fact that the relay 73 remains closed. Upon completion of the downward stroke of the ram, occasioned by the operation of the motor 27 of FIGS. 1 and 6, the switch 34 is closed and the relay 73 will be opened. When the relay 73 is opened, both valves 66 and 69 will be returned by their respective springs to the positions shown in FIG. 5.

Referring now to FIG. 6, which is a fluid circuit diagram for the motor 27, a description of the sequence of operation of the motor 27 will be given.

A suitable source of fluid under pressure will be connected to the inlet line 74. Line 74 is connected to a regulating valve 75 which provides a pre-set, constant pressure output in the line 76. The valve 75 preferably is set so that it provides a constant pressure of 500 p.s.i. in the outlet line 76. Line 76 in turn is connected to one port of a dual solenoid operated valve 77. As represented in FIG. 6, the valve 77 is of the two-position spool type having four ports. The two solenoids 78 and 79 connected to the valve 77 are individually actuated respectively by switches 33 and 34, it being understood that operation of the solenoid 79 by the closing of the switch 34 will cause the valve to be shifted to the position shown in FIG. 6 where it will remain in this position until it is shifted by operation of the solenoid 78 upon closing of the switch 33. The particular position of the valve as shown in FIG. 6, indicates the period in the cycle of operation of the motor 27 when its output shaft 26 is being raised by the flow of plastic into the chamber or bore 21 in the block 10.

As previously described, the apparatus of the invention is of particular utility when testing foamed plastics and it has been determined that in order to prevent foaming of the plastic within the tester, prior to testing, it is necessary that a certain amount of biasing pressure be maintained on the plastic as it is being loaded into the chamber or bore 21.

With this in view, the line 80, which is connected to the top of the motor 27, is connected through the valve 77 to a constant pressure relief valve 81. Thus it can be seen that, depending upon the setting of the valve 81 which for example may be at five p.s.i., a certain pressure is maintained on the motor 27 during its filling. Once the filling is completed, as determined by the closing of the switch 33 by the plate 35, the spool of the valve 77 will be shifted upwardly and place the high pressure line 76 in communication with the line 80 connected to the upper end of the motor 27.

The lower end of the motor 27 is in communication with a vent pipe 82 open to the atmosphere.

The fourth port of the valve 77 is plugged, as shown diagrammatically at 83, serving to shut off the high pressure fluid during the filling interval.

In summary, the apparatus of the invention may operate continuously to sequentially test samples of foam thermoplastic material, wherein the plastic material having the foaming agent incorporated therein is fed under pressure to a measuring chamber wherein a regulated, predetermined volume of material is collected under pressure preventing foaming thereof. After the measuring chamber has been filled, the predetermined quantity of thermoplastic or plastic material containing the foaming agent is then forced through a capillary passage of predetermined length and diameter with a predetermined, pre-set force. Thus the shear stress is known. The time required for the particular quantity of plastic material to be extruded through the capillary is recorded. Thus the shear rate becomes a measured factor.

From the foregoing, the flow properties and working properties of the thermoplastic material are determined so as to provide information necessary in the subsequent utilization of the particular foamed plastics used to make articles such as bottles.

Various modifications may be resorted to within the spirit and scope of the appended claim.

I claim:

1. Apparatus for measuring the rheological properties of thermoplastics containing foaming agents comprising, a constant temperature measuring block, a vertical passageway extending through said block and forming a predetermined-volume, measuring chamber, extruder means connected to said block for feeding the thermoplastic to be tested under pressure through a passage in said block communicating with said meauring chamber, a closely fitting plunger extending into the upper end of said passageway, a restricted outlet member closing the lower end of said chamber, a vertically disposed, reciprocating fluid motor connected to said plunger, a source of high pressure fluid, a conduit extending from said source of high pressure fluid to the upper end of said fluid motor, a two-position spool valve interposed said conduit, a preset, pressure relief valve connected to said spool valve, said spool valve being shiftable for selectively cimmunicating said source of high pressure fluid with said motor, in one position, and connecting said motor to said pressure relief valve in the other position to thereby maintain a biasing pressure within said motor for biasing said plunger in a downward direction against the inflow of plastic to said chamber during the filling of said measuring chamber to thereby prevent premature foaming of said thermoplastic, means responsive to a predetermined movement of said plunger out of said chamber for cutting off the feed of thermoplastic to said chamber and operating said spool valve for connecting said source to said fluid motor for driving the plunger downward to force the plastic out of said chamber through said restricted outlet under predetermined pressure, and means for indicating the time required to force a predetermined volume of plastic from said chamber.

References Cited

UNITED STATES PATENTS 3,203,225   8/1965   Sieglaff et al. _____ 73—56 XR
3,242,720   3/1966   Zavasnik _____ 73—56

DAVID SCHONBERG, *Primary Examiner.*